United States Patent [19]

Liencres

[11] Patent Number: 5,287,362
[45] Date of Patent: Feb. 15, 1994

[54] MECHANISM FOR IMPLEMENTING MULTIPLE TIME-OUTS

[75] Inventor: Bjorn Liencres, Palo Alto, Calif.

[73] Assignee: Sun Microsystems, Inc., Mountain View, Calif.

[21] Appl. No.: 885,120

[22] Filed: May 18, 1992

[51] Int. Cl.⁵ .................................... G06F 11/00
[52] U.S. Cl. ........................ 371/16.3; 377/15
[58] Field of Search .............. 377/15, 16; 371/16.3; 395/550, 575

[56] References Cited

U.S. PATENT DOCUMENTS

| | | | |
|---|---|---|---|
| 3,795,800 | 3/1974 | Nimmo | 371/16.3 |
| 4,538,273 | 8/1985 | Lasser | 371/16.3 |
| 4,627,060 | 12/1986 | Huang et al. | 371/16.3 |
| 5,014,190 | 5/1991 | Johnson | 371/16.3 |
| 5,233,613 | 8/1993 | Allen et al. | 371/16.3 |

FOREIGN PATENT DOCUMENTS

| | | | |
|---|---|---|---|
| 0055601 | 3/1988 | Japan | 371/16.3 |
| 2047446 | 11/1980 | United Kingdom | 371/16.3 |

*Primary Examiner*—John S. Heyman
*Attorney, Agent, or Firm*—Blakely Sokoloff Taylor & Zafman

[57] ABSTRACT

A time-out detector for a computer system to record any number of time-out events with a predetermined period. The time-out detector comprises A-counter coupled to a transmission medium for incrementing in response to an initiating event and decrementing in response to a terminating event; B-counter coupled to the transmission medium for incrementing in response to an initiating event and decrementing in response to a terminating event; I-state bit coupled to the A- and B-counters for toggling between logic 0 and logic 1 states at each prescale pulse, wherein the logic 0 state causes the A-counter to increment by 1 count at each initiating event, and the logic 1 state causes the B-counter to increment by 1 count at each initiating event; T-state bit coupled to the A- and B- counters for toggling between logic 0 and logic 1 states, wherein the logic 0 state causes the A-counter to decrement by 1 at each terminating event, and if the contents of said A-counter is then equal to 0, the T-state bit is set to 1. The logic 1 state causes the B-counter to decrement by 1 at each terminating event, and if the contents of said B-counter is then equal to 0, the T-state bit is reset to 0, such that the A-counter records any number of time-out events when the I-state bit is logic 1 and the B-counter records any number of time-out events when the I-state bit is logic 0.

13 Claims, 6 Drawing Sheets

| EVENTS | | | | | | | | | | | | | | | | |
|---|---|---|---|---|---|---|---|---|---|---|---|---|---|---|---|---|
| | I | I | I | T | | I | T | I | T | | I | T | | | | |
| A COUNTER | 0 | 1 | 2 | 3 | 2 | | 2 | 1 | 2 | 1 | 0 | | | | | |
| B COUNTER | 0 | | | | | | 1 | 2 | | 1 | 2 | | | 0 | | |
| I-BIT | 0 | | | | | 1 | | | | | | 1 | | | | |
| T-BIT | 0 | | | | | | | | 1 | | | | | 0 | | 1 |
| C-REGISTER | 0 | | | | | | | | | | | 0 | | | | 1 |
| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
| | 1ST P-PERIOD | | | | 2ND P-PERIOD | | | | 3RD P-PERIOD | | | | 4TH P-PERIOD | | | |

*Figure 4*

MECHANISM FOR IMPLEMENTING MULTIPLE TIME-OUTS

BACKGROUND OF THE INVENTION

1. Field of the Invention

The present invention relates to a computer system and more specifically to the hardware time-out mechanism of a computer system.

2. Art Background

In a computer system, time-outs are used to ensure a temporal boundary of events. If two events (an initiating event and a terminating event) are not detected within a certain time period, a time-out has occurred. For example, in a computer system with a processor connected to several Input/Output ("I/O") cards, a processor reading an address location in one of the I/O cards will issue a read request to its desired I/O card. When a reply packet is received within a certain number of cycles after issuing the read request, no time-out is generated. However, if the read reply never comes back, the processor should not have to wait forever because the I/O card may not even exist or be in operation. Therefore, a time-out can serve to notify the operating system or the processor that this I/O card does not exist and the operating system should take whatever appropriate actions it is designed to do, for example, re-boot or retry. As shown in FIG. 1, time-outs are typically implemented with a counter 100 that is started and incremented at an initiating event 101. The counter 100 can then be disabled if a terminating event 102 occurs. If the counter 100 reaches a predetermined value 103 and a terminating event 102 has not occurred, then a time-out has occurred in the system. For example, an initiating event 101 in this system can be a processor executing a read to an address and setting a time-out value 103 which terminates or stops the counter 100 when the value is reached by the counter 100. A terminating event 102 such as an I/O device responding to the processor read with data will reset the counter 100 and no time-out has occurred. Typically, a valid bit 110 is set when an initiating event 101 is generated to start the counter 100. If a terminating event 102 occurs, the valid bit 110 is reset while the contents of the counter is disregarded. When the next initiating event 101 occurs, the valid bit 110 is again set and the counter 100 started. But, if the counter 100 is greater than the time-out value 103 while the valid bit 110 is set, then a time-out has occurred because the terminating event 102 has not been received.

For a typical computer system, it is desirable and necessary to detect multiple time-outs of events that start at different times. FIG. 2 illustrates a block diagram of components for detecting multiple time-outs. This typically requires multiple counters 200–203, although sometimes with a common prescaler 210 to set the period. Each counter implements a time-out for a different pair of initiating and terminating events. After each preset interval, the prescaler 210 will generate a pulse 211–214 to a corresponding counter. If the counter has reached a predetermined number when the pulse is received and a corresponding valid bit 220–223 is set for that particular initiating event, a time-out has occurred. As can be appreciated by those skilled in the art, implementing and detecting multiple time-outs would typically require duplicating the counters 200–203 and the valid bits 220–223 for each additional pair of the time-outs. Thus, if there were 16 time-outs it will be 16*2=32 flip-flops, plus the additional control logic. Given the fact that counters are typically quite large in terms of silicone area, replicating the counter circuit becomes a highly undesirable solution in a typical computer system.

Additionally, a computer system quite often has classes of time-outs and for each class of time-outs it is required to implement a multiple time-out mechanism, while the practicality of a computer system only needs one outstanding time-out event to generate further actions without regard to when the additional time-outs occur in each class. As such, within each class, the computer need not distinguish one time-out from another. For example, in a processor capable of issuing multiple commands to multiple I/O devices, all the processor needs to know is which I/O device experiences a time-out without regard to which exact address within the I/O device times-out before the processor re-boots or retries. With this understanding the need to replicate a counter and valid bit for each time-out pair becomes more undesirable and impractical as the number of devices increases linearly with the number of events in a computer system.

SUMMARY OF THE INVENTION

Therefore, it is an object of the present invention to detect multiple time-outs in a computer system.

It is also an object of the present invention to be able to detect such multiple time-outs in a computer system within a predetermined time frame.

It is further an object of the present invention to be able to detect multiple time-outs without duplicating the time-out circuitry in a linear manner with the number of time-out pairs.

It is another object of the present invention to detect any number of time-outs using a given set of circuitry.

A time-out detector for a computer system to record any number of time-out events with a predetermined period is disclosed. The time-out detector comprises A-counter coupled to a transmission medium for incrementing in response to an initiating event and decrementing in response to a terminating event; B-counter coupled to the transmission medium for incrementing in response to an initiating event and decrementing in response to a terminating event; I-state bit coupled to the A- and B- counters for toggling between logic 0 and logic 1 states at each prescale pulse, wherein the logic 0 state causes the A-counter to increment by 1 count at each initiating event, and the logic 1 state causes the B-counter to increment by 1 count at each initiating event; T-state bit coupled to the A- and B- counters for toggling between logic 0 and logic 1 states, wherein the logic 0 state causes the A-counter to decrement by 1 at each terminating event, and if the contents of said A-counter is then equal to 0, the T-state bit is set to 1. The logic 1 state causes the B-counter to decrement by 1 at each terminating event, and if the contents of said B-counter is then equal to 0, the T-state bit is reset to 0, such that the A-counter records the number of time-out events for any number of time-out events when the I-state bit is logic 1 and the B-counter records the number of time-out events for any number of time-out events when the I-state bit is logic 0.

BRIEF DESCRIPTION OF THE DRAWINGS

The objects, features and advantages of the present invention will be apparent from the following detailed description of the preferred embodiment in which:

FIG. 4 is a timing diagram showing the operation of the present invention.

NOTATION AND NOMENCLATURE

Figure 1:
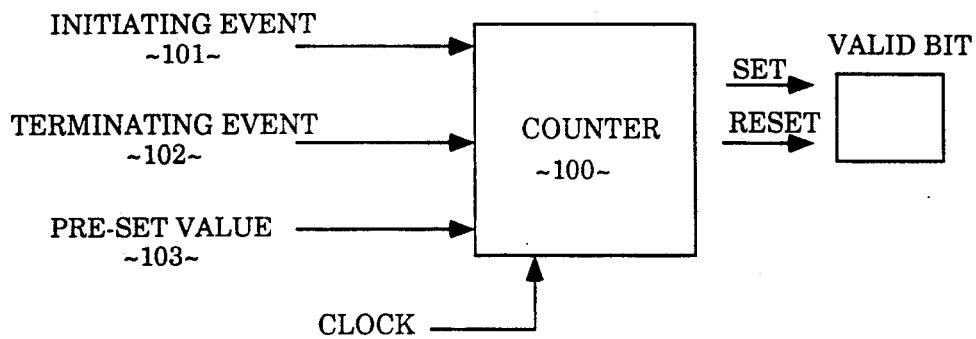
FIG. 1 is a simplified block diagram illustrating a typical time-out implementation.
Figure 2:
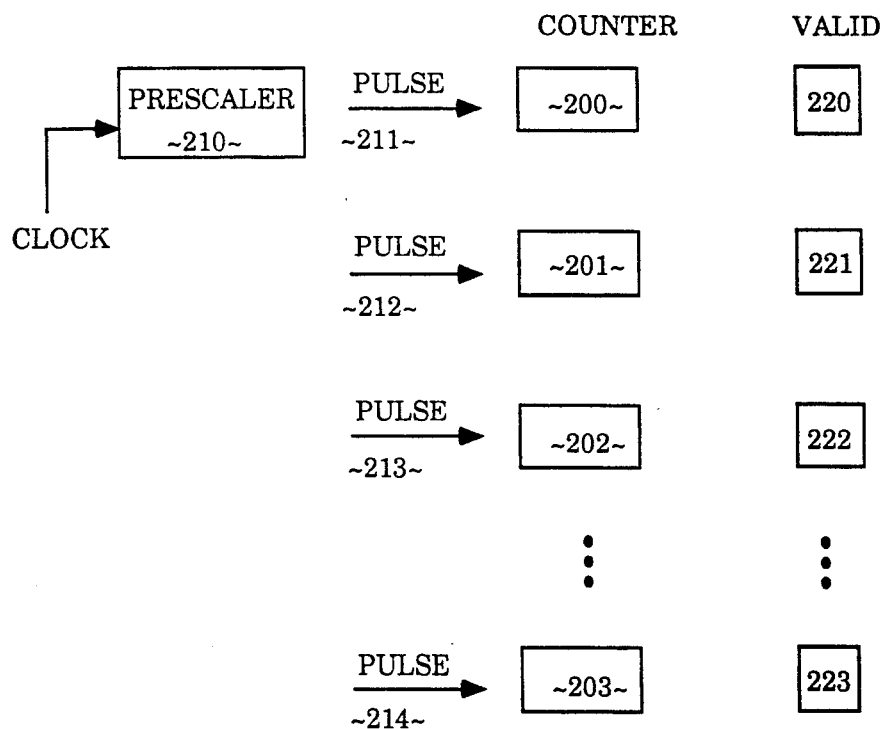
FIG. 2 is a component block diagram of a typical time-out implementation for multiple pairs of time-outs.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

CODING DETAILS

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

A method and apparatus for detecting any number of multiple time-outs in a computer system is disclosed. In the following description for purposes of explanation, specific registers, counters, memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

As will be described, the present invention uses a given arrangement of circuits to implement multiple time-outs within a given period. The present invention uses only three counters, one adder and some state bits for detecting any number of time-outs within a given period. As a result, although the particular pair of events that timed-out is not discernable, the number of time-outs in the given period is. In addition, the time-outs will not occur on a predictable cycle but are guaranteed to happen within the given period.

Figure 3:
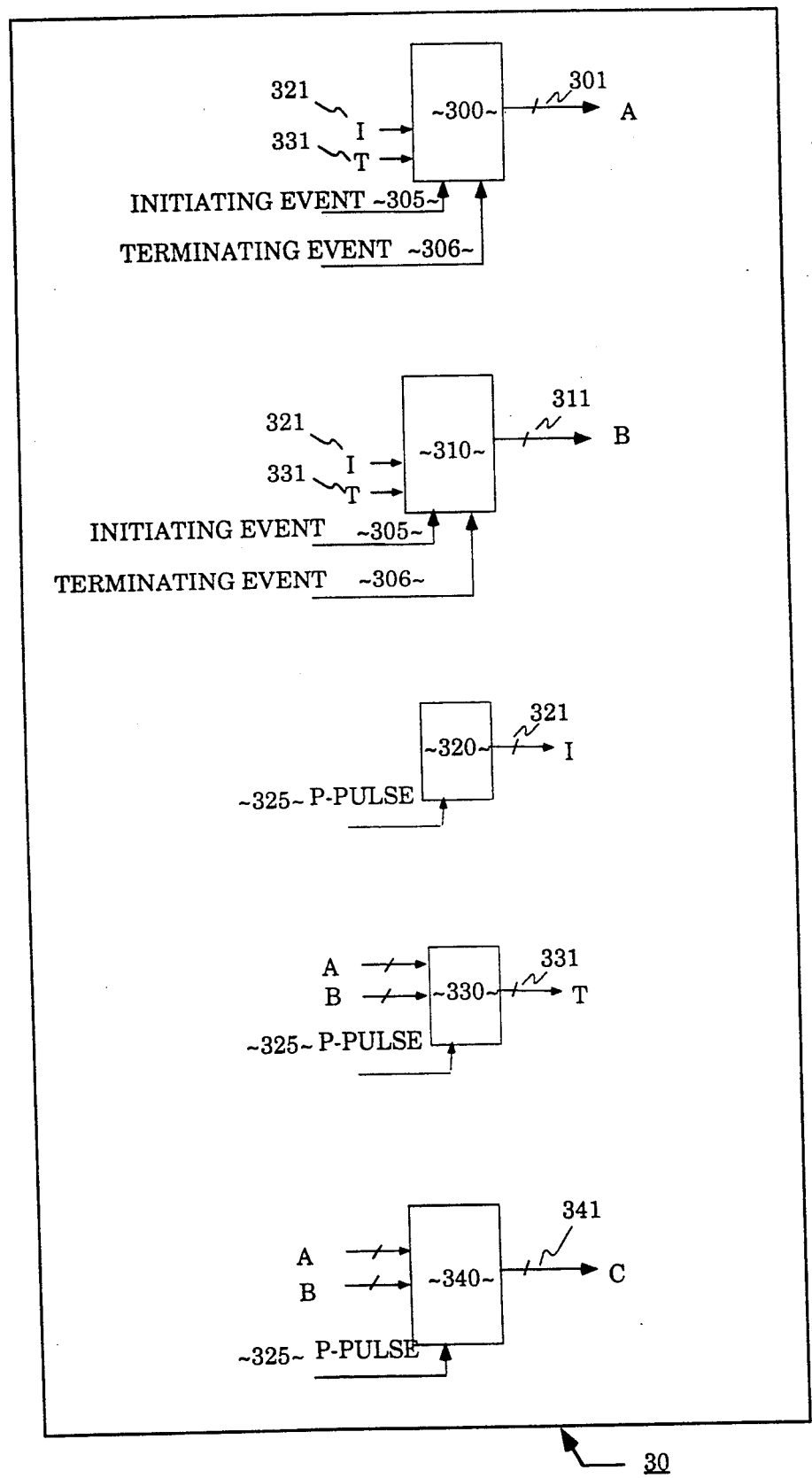
FIG. 3 is a simplified block diagram of the present invention.

Reference is now made to FIG. 3, where a simplified block diagram of the present invention is illustrated. Block 300 evaluates signal I 321 from block 320 and signal T 331 from block 330 for each initiating event 305 and terminating event 306, respectively, to generate signal A 301. Block 310 evaluates signal I 321 from block 320 and signal T 331 from block 330 for each initiating event 305 and terminating event 306, respectively, to generate signal B 311. Block 320 generates signal I 321 upon each P-pulse 325. Block 330 evaluates the values of signals A 301 and B 311 upon each P-pulse 325 to generate signal T 331. Block 340 evaluates signals A 301 and B 311 upon each P-pulse 325 to generate signal C 341. It should be noted that signals A 301 and B 311 represent the values in A counter and B counter (to be described), respectively. Signals I 321 and T 331 represent the value of I state bit and T state bit, respectively. Signal C 341 represents the number of timed-out events within a given period as recorded in a C register (to be described). Signal P-pulse 325 represents a prescaled pulse from a prescaler mechanism. The following rules govern the functions of blocks 300, 310, 320, 330 and 340.

For each initiating event:

If $I=0$, $A=A+1$; if $I=1$, $B=B+1$;

For each terminating event:

If $T=0$, $A=A-1$; if $A$ is then 0, set $T=1$;

If $T=1$, $B=B-1$; if $B$ is then 0, set $T=0$;

For every P-pulse from a prescaler;

If $I=0$, set $I=1$; if $B\neq 0$, $C=C+B$; set $B=0$;

If $I=1$, set $I=0$; if $A\neq 0$, $C=C+A$; set $A=0$, where C records the number of time-out events at every P-pulse.

Reference is now made to FIG. 4, where a timing diagram of the present invention as operated pursuant to the above described rules is described. Note that letters "I" and "T" represent initiating and terminating events, respectively. Represented in each row in the timing diagram are the values of the counters, state bits and register as they vary in time. First, with respect to A-counter ("A"), for each initiating event where I-bit is zero, A is incremented by 1. And for each terminating event where T-bit=0, A is decremented by 1. As a result, at t4, the end of the first prescale period A retains a value of 2 since there were three initiating events and one terminating events. Within the same period from t0 to t4, B-counter ("B") is 0 because I-bit remains 0. Note that with T-bit=0 at t4 when a terminating event occurs, A is decremented by 1. For the next P-period, I-bit is first toggled to from 0 to 1 at t5. At t6, B is incremented by 1 because of I-bit=1 while A remains at 2. At t7 with a terminating event occurring, A is decremented by 1 because T-bit is still zero. At t8 with an initiating event occurring, B is incremented by 1 because I-bit is still 1 while A is unchanged. At t9 with a terminating event occurring, A is decremented by 1 to 0, which causes T-bit to be set to 1.

Note that C-register ("C") remains 0 at t9 because all three initiating events in the first two P-periods have been terminated during the same period by the three terminating events. Initiating events at t6 and t8 have not timed-out because the two P-periods have not run out yet. As such, the two initiating events at t6 and t8 will be looked at t14.

At the third prescale pulse from prescaler, I-bit is toggled from 1 to 0. At t11 with a terminating event occurring, B is decremented by 1 because T-bit=0. It should be noted that the series of initiating and terminating events are purely hypothetical for the purpose of illustrating the operation of the present invention. At the next prescale pulse (4th P-pulse) from prescaler, I-bit is toggled from 0 to 1. Because B is not equal to 0, C is incremented by the value of B, which is 1. B is reset to 0. At this time C records the number of event pairs that have timed-out up to this point, i.e. one event pair that has timed-out up to this point (five initiating events with only four terminating events each within two periods from an initiating event). Essentially, with A-counter and B-counter, I-bit points to the counter that should be incremented as events are detected and T-bit points to the counter that should be decremented as events are detected. Therefore, if one of the counters is not decremented by the time it is pointed by the flip-flopping I-bit again, a time-out has occurred. Also, T-bit gets toggled whenever one of the counters gets to 0. It should be noted that C records the number of events that have timed-out in two periods; however, C would become an optional feature when only the presence of a time-out is pertinent to the processor operation as will be appreciated by those skilled in the art, e.g. when a computer should be rebooted when an error occurred while doing a write to memory without regard to how many events have timed-out.

Figure 5A:
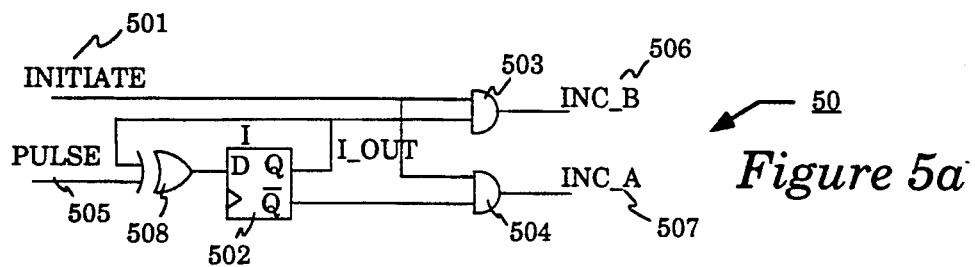
FIGS. 5(a)-5(e) are logic diagrams of one embodiment of the present invention.

Reference is now made to FIGS. 5(a)-5(e), where schematic diagrams of one embodiment of the present invention are illustrated. Referring now to FIG. 5(a), circuit 50 implements either inc_B 506 signal or inc_A 507 signal, depending upon whether there is an initiating event 501 and the value of I-state bit 502. As such, for each initiating event, if I_out=0, inc_A 507 is asserted. Likewise, if I_out=1, inc_B 506 is asserted. Also, I_out is toggled as pulse 505 is applied to the exclusive-OR gate 508.

Figure 5B:
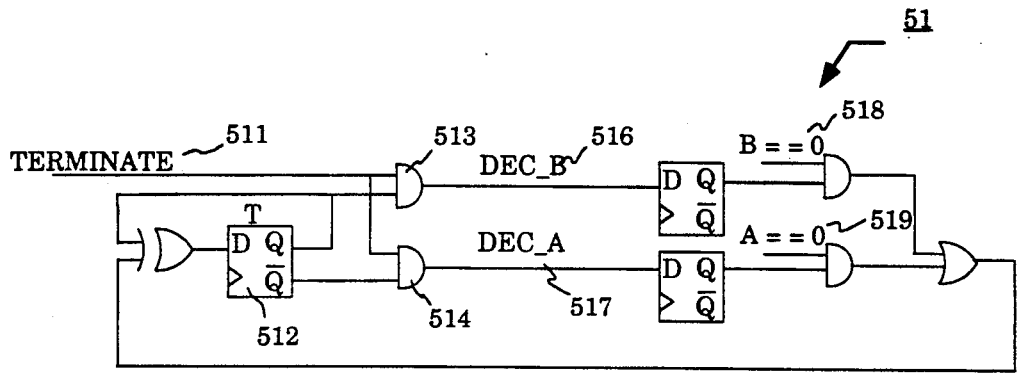

Referring now to FIG. 5(b), circuit 51 generates either dec_B 516 signal or dec_A 517 signal, depending upon whether there is a terminating event 511 and upon the status of T-register 512. As such, for each terminating event, if T_out=0, dec_A 517 is asserted. Furthermore, if A-register is equal to 0 as a result of the decrement, T-register 512 is toggled to 1. If T_out=1, dec_B 516 is asserted. And then if B-register is 0 as a result of the decrement, T-register 512 is toggled from one to 0. Note that signals B==0 518 and A==0 519 represent the conditions that B-register is 0 and that A-register is 0, respectively.

Figure 5C:
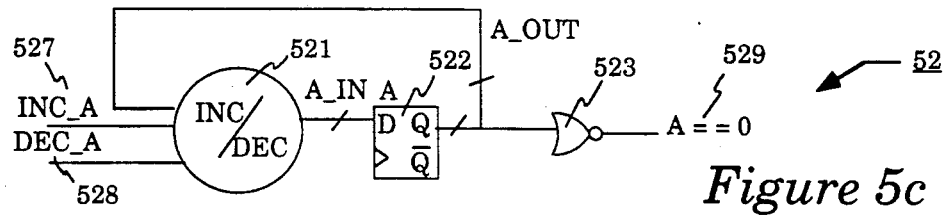
Figure 5D:
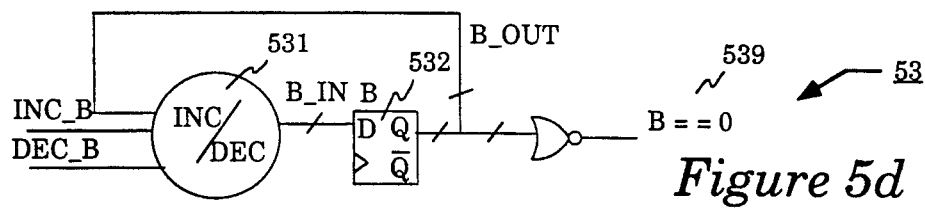

Referring now to FIG. 5(c) circuit 52 implements the incrementing and decrementing of counter A 521. Signals inc_A 527 and dec_A 528 from circuits 50 and 51 are applied to counter A 521 to increment or decrement its contents, which is then output to A-register 522. When A-register 522 reads A_out=0, signal A==0 529 is asserted through NOR-gate 523. With reference to FIG. 5(d), circuit 53 similarly implements the incrementation and decrementation of counter B 531 and signal B==0 539.

Figure 5E:
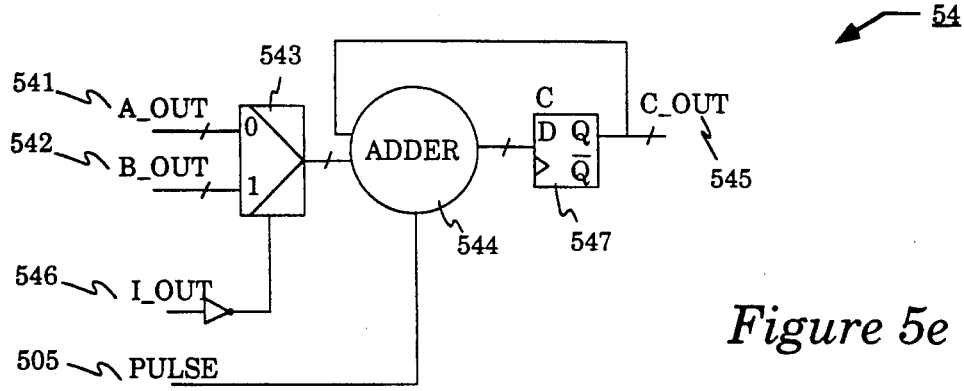

Referring now to FIG. 5(e), circuit 54 implements the C-counter which records the number of event pairs that have timed-out. Signal I_out 546, through an inverter, is applied to multiplexer 543 for selecting inputs from either A_out 541 or B_out 542, dependent upon the value of I_out 546. If I_out 546=0 and if B_out 542 is not equal to 0, B_out 542 is added by C-register 547 at adder 544. If I_out 546 equals 1 and if A_out 541 is not equal to 0, A_out 541 is added by C_out 545 at adder 544. As a result C_out 545 records the number of time-outs. Note that signals A_out 541, B_out 542, A_in and B_in are vectors that comprise several bits and registers A 522, B 532 and C 547 are multi-bit registers.

Figure 6A:
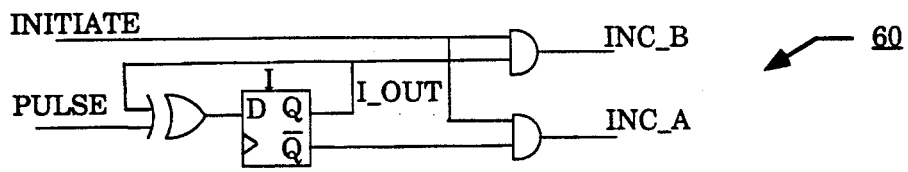
FIGS. 6(a)-6(e) are logic diagrams of another embodiment of the present invention.
Figure 6B:
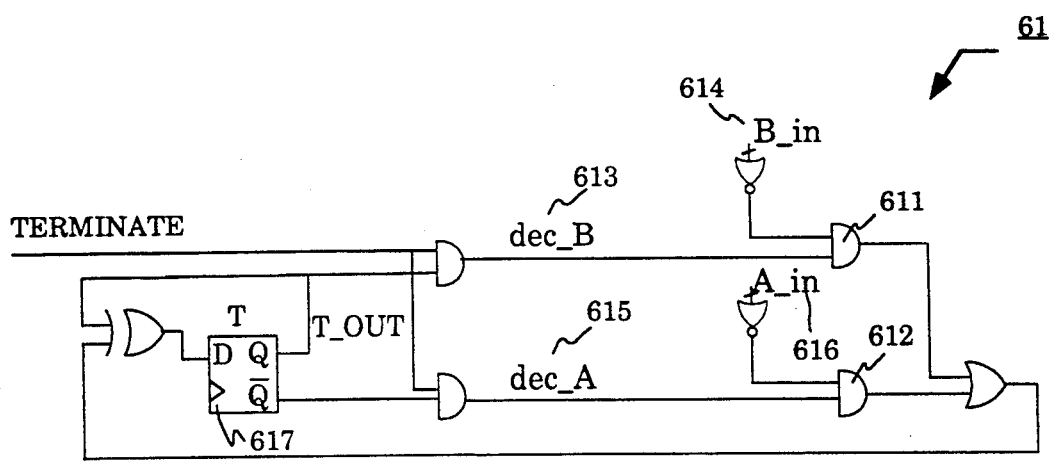
Figure 6C:
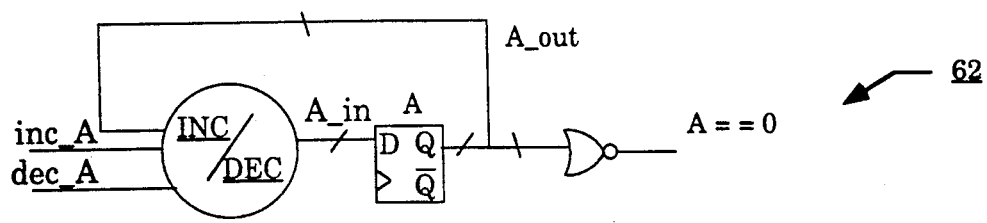
Figure 6D:
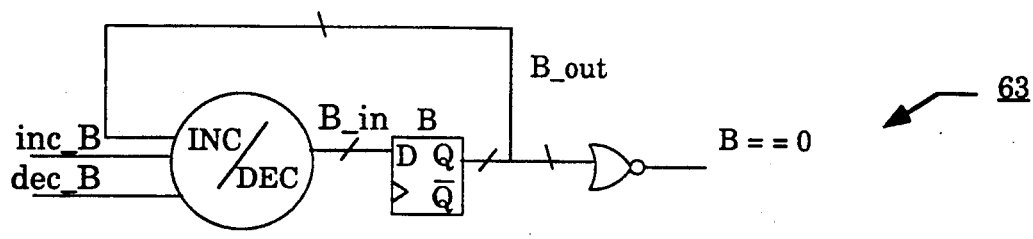
Figure 6E:
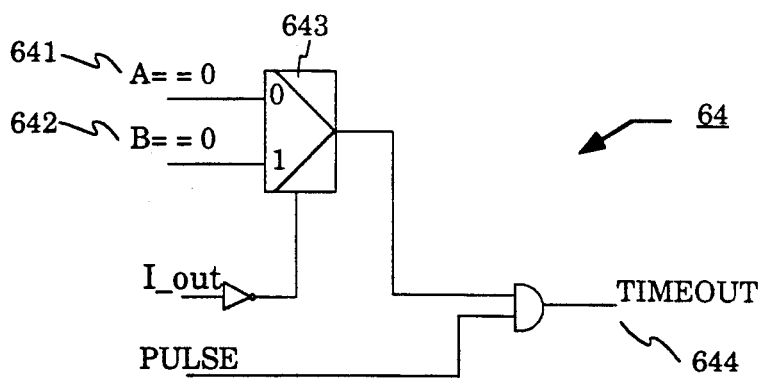

Reference is now made to FIGS. 6(a)-6(e), where schematic diagrams of another embodiment of the present invention are illustrated. Note that the second embodiment differs from the first embodiment in that only the presence of time-outs, not the number of time-outs, is detected. Referring now to FIG. 6(b), circuit 61 to circuit 61, signals dec_B 613 and dec_A 615 are applied to AND-gates 611 and 612 in conjunction with B_in signal 614 and A_in signal 616. As a result, T-register 617 will be toggled when either B_in 614 are all 0 and dec_B 613 is asserted, or the condition that signals A_in 616 are all 0 and signal dec_A 615 is 0.

Referring now to FIG. 6(a), circuit 64 to circuit 64, the assertion of either A==0 641 or B==0 642 at the appropriate I_out bit into multiplexor 643 will cause time-out signal 644 to be asserted at each pulse. This is for a more compact design. Furthermore, since C-counter 544 as in FIG. 5(e) is not implemented in this embodiment, only the detection of time-outs is implemented without recording the number of time-outs.

Although the present invention has been described with two embodiments, it should be understood by those skilled in the arts that other embodiments can be implemented which are governed by the above described algorithm.

I claim:

1. A time-out detector for a computer system to record any number of time-out events with a predetermined period, each of said time-out events being caused by not detecting an initiating event and terminating event communicated from a transmission medium within said predetermined period after detecting said initiating event, said predetermined period being a multiple of a prescaled period, the beginning and end of said prescaled period being marked by a prescale pulse, said time-out detector comprising:

A-counter coupled to said transmission medium for incrementing in response to an initiating event and decrementing in response to a terminating event;

B-counter coupled to said transmission medium for incrementing in response to an initiating event and decrementing in response to a terminating event;

I-state bit coupled to said A- and B- counters for toggling between logic 0 and logic 1 states at each prescale pulse, said logic 0 state causing said A-counter to increment by 1 count at each initiating event; said logic 1 state causing said B-counter to increment by 1 count at each initiating event;

T-state bit coupled to said A- and B- counters for toggling between logic 0 and logic 1 states; said logic 0 state causing said A-counter to decrement by 1 at each terminating event, and if the contents of said A-counter is then equal to 0, said T-state bit being set to 1; said logic 1 state causing said B-counter to decrement by 1 at each terminating event, and if the contents of said B-counter is then equal to 0, said T-state bit being reset to 0, whereby said A-counter records the number of time-out events when said I-state bit is logic 1 and said B-counter records the number of time-out events when said I-state bit is logic 0.

2. A time-out detector according to claim 1, further comprising:

C-register coupled to said A- and B-counters for counting sum of said numbers of time-out events recorded by said A- and B- counters, said C-register adding the contents of said B-counter if said contents is not equal to 0 at each prescale pulse, and resetting said B-counter at said prescale pulse; said C-register adding the contents of said A-counter if said contents is not equal to 0 at each prescale pulse, and then resetting said A-counter at said prescale pulse.

3. A time-out detector according to claim 2, wherein said predetermined period is less than two times said prescaled period and more than said one times said prescaled period.

4. A time-out detector according to claim 3, wherein said I-state bit is a D-type flip-flop coupled to said A- and B- counters and said T-state bit is a D-type flip-flop coupled to said A- and B- counters.

5. A time-out detector according to claim 4, wherein said A- and B- counters are bi-directional counters capable of incrementing and decrementing.

6. A time-out detector according to claim 5, further comprising a prescaler means coupled to said A-counter and B-counter for generating said prescaled pulse after each of said prescaled period.

7. A method of detecting any number of time-out events for a computer system with a predetermined period by using A-counter, B-counter, I-state bit, T-state bit and C-register, each of said time-out events being caused by not detecting an initiating event and terminating event communicated from a transmission medium coupled to said computer system within said predetermined period, the beginning and end of said predetermined period being marked by a prescale pulse, said method comprising:

incrementing said A-counter if said I-state equals to 0 at each initiating event;

incrementing said B-counter if said I-state bit equals to 1 at each initiating event;

decrementing said A-counter if said T-state bit equals to 0 at each terminating event and if said B-counter is then equal to 0, setting said T-state bit to 1;

decrementing said B-counter if said T-state bit equals to 1 at each terminating event and if said B-counter is then equal to 0, setting said T-state bit to 0;

at each said prescale pulse:
  setting said I-state bit to 1 if said I-state bit is 0; incrementing said C-register by the contents of said B-counter if said B-counter is not equal to 0, and then resetting said B-counter to 0;
  resetting said I-state bit to 0 if said I state bit is 1; incrementing said C-register by the contents of said A-counter if said A-counter is not equal to 0, and then resetting said A-counter to 0.

8. A method of detecting hardware time-outs for a computer system by recording any number of time-out events with a predetermined period, each of said time-out events being caused by not detecting an initiating event and terminating event communicated from a transmission medium within said predetermined period after detecting said initiating event, said predetermined period being a multiple of a prescaled period, the beginning and end of said prescaled period being marked by a prescale pulse, said method comprising the steps of:

incrementing in response to an initiating event and decrementing in response to a terminating event by A-counter coupled to said transmission medium;

incrementing in response to an initiating event and decrementing in response to a terminating event by B-counter coupled to said transmission medium;

toggling I-state bit coupled to said A- and B- counters between logic 0 and logic 1 states at each prescale pulse, said logic 0 state causing said A-counter to increment by 1 count at each initiating event; said logic 1 state causing said B-counter to increment by 1 count at each initiating event;

toggling T-state bit coupled to said A- and B- counters between logic 0 and logic 1 states; said logic 0 state causing said A-counter to decrement by 1 at each terminating event, and if the contents of said A-counter is then equal to 0, said T-state bit being set to 1; said logic 1 state causing said B-counter to decrement by 1 at each terminating event, and if the contents of said B-counter is then equal to 0, said T-state bit being reset to 0, whereby said A-counter records the number of time-out events when said I-state bit is logic 1 and said B-counter records the number of time-out events when said I-state bit is logic 0.

9. A method according to claim 8, further comprising the step of:

counting sum of said numbers of time-out events recorded by said A- and B- counters by C-register coupled to said A- and B- counters, said C-register adding the contents of said B-counter if said contents is not equal to 0 at each prescale pulse, and resetting said B-counter at said prescale pulse; said C-register adding the contents of said A-counter if said contents is not equal to 0 at each prescale pulse, and then resetting said A-counter at said prescale pulse.

10. A method according to claim 9, wherein said predetermined period is less than two times said prescaled period and more than said one times said prescaled period.

11. A method according to claim 10, wherein said I-state bit is a D-type flip-flop coupled to said A- and B- counters and said T-state bit is a D-type flip-flop coupled to said A- and B- counters.

12. A method according to claim 11, wherein said A- and B- counters are bi-directional counters capable of incrementing and decrementing.

13. A method according to claim 12, further comprising the step of generating said prescaled pulse after each of said prescaled period a prescaler means coupled to said A-counter and B-counter.

* * * * *